United States Patent
Lee

(10) Patent No.: US 11,163,972 B2
(45) Date of Patent: Nov. 2, 2021

(54) CONVERGENT BIOMETRIC AUTHENTICATION METHOD BASED ON FINGER JOINT AND FINGER VEIN, AND APPARATUS THEREFOR

(71) Applicant: NAR TECHNOLOGY CO., LTD, Busan (KR)

(72) Inventor: Byung Do Lee, Busan (KR)

(73) Assignee: NAR TECHNOLOGY CO., LTD, Busan (KR)

( * ) Notice: Subject to any disclaimer, the term of this patent is extended or adjusted under 35 U.S.C. 154(b) by 360 days.

(21) Appl. No.: 15/777,570

(22) PCT Filed: Dec. 2, 2016

(86) PCT No.: PCT/KR2016/014082
§ 371 (c)(1),
(2) Date: May 18, 2018

(87) PCT Pub. No.: WO2017/099427
PCT Pub. Date: Jun. 15, 2017

(65) Prior Publication Data
US 2020/0311379 A1 Oct. 1, 2020

(30) Foreign Application Priority Data
Dec. 8, 2015 (KR) .................. 10-2015-0173767

(51) Int. Cl.
*G06K 9/00* (2006.01)
*G06T 7/11* (2017.01)
*G06F 21/32* (2013.01)

(52) U.S. Cl.
CPC ....... *G06K 9/00087* (2013.01); *G06K 9/0004* (2013.01); *G06K 9/00067* (2013.01); *G06T 7/11* (2017.01); *G06F 21/32* (2013.01)

(58) Field of Classification Search
CPC ..... G06K 2009/00932; G06K 9/00013; G06K 9/00; G06K 2009/0006; G06K 9/00006; G06F 21/32
USPC .................................. 382/115, 124
See application file for complete search history.

(56) References Cited

U.S. PATENT DOCUMENTS

| 8,229,179 B2 * | 7/2012 | Sato ............... G06K 9/0004 382/115 |
| 2010/0098299 A1 * | 4/2010 | Muquit .............. G06K 9/00013 382/115 |
| 2012/0230555 A1 * | 9/2012 | Miura ................. G06K 9/00926 382/124 |

FOREIGN PATENT DOCUMENTS

| JP | 2014-167799 A | 9/2014 |
| KR | 10-0831625 B1 | 5/2008 |
| KR | 10-2009-0065026 A | 6/2009 |
| KR | 10-0940902 B1 | 2/2010 |
| KR | 10-1017798 B1 | 3/2011 |
| KR | 10-1037378 B1 | 5/2011 |

(Continued)

*Primary Examiner* — Koosha Sharifi-Tafreshi
(74) *Attorney, Agent, or Firm* — Maschoff Brennan

(57) ABSTRACT

The present invention relates to a convergent biometric authentication method based on a finger joint and a finger vein, and an apparatus therefor, which can solve the phenomenon of recognition rate degradation according to a change in finger positions by matching a fingerprint image of the finger joint and a fingerprint image of the finger vein, and can improve the recognition rate and authentication speed by means of a few number of feature points.

7 Claims, 3 Drawing Sheets

(56) References Cited

FOREIGN PATENT DOCUMENTS

KR       10-1496852 B1    3/2015
KR   10-2015-0104544 A    9/2015

\* cited by examiner

[FIG. 1]
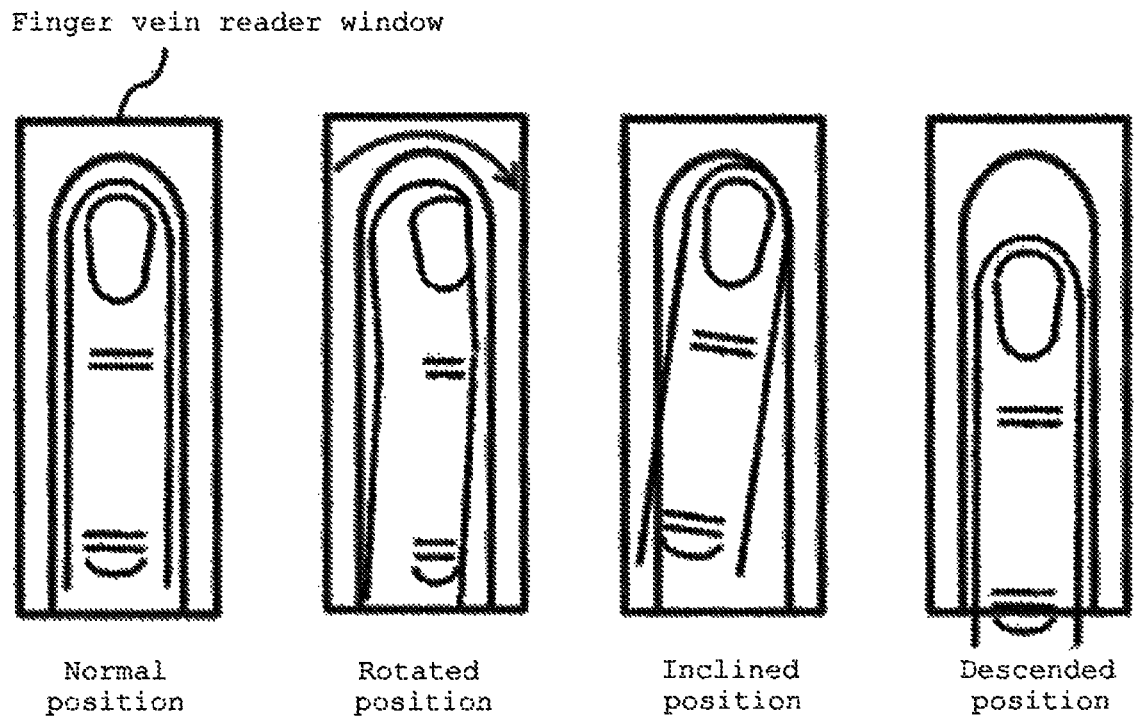
[FIG. 2]
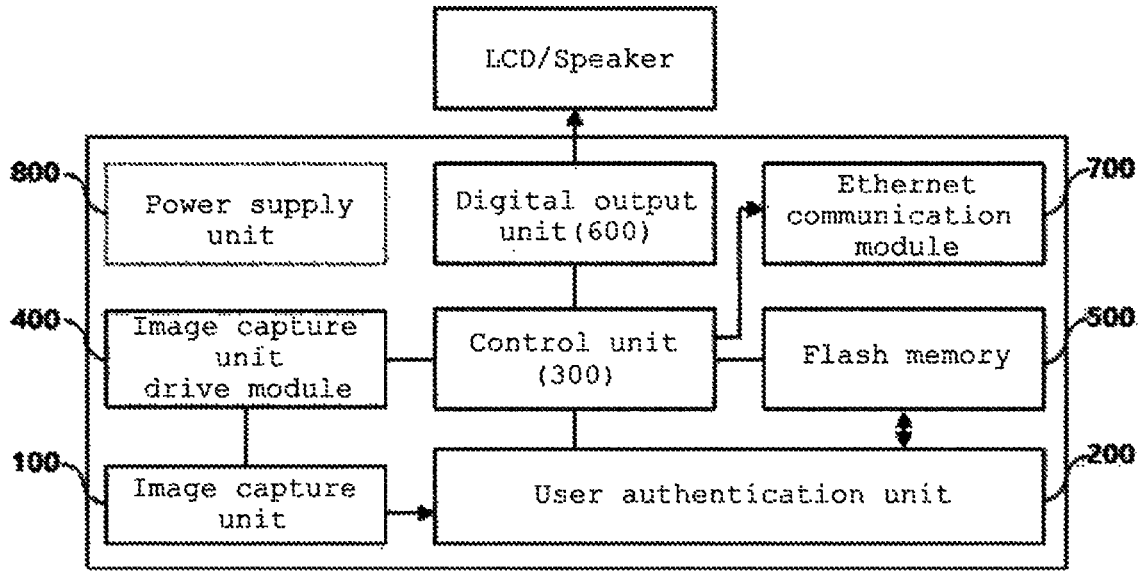

CONVERGENT BIOMETRIC AUTHENTICATION METHOD BASED ON FINGER JOINT AND FINGER VEIN, AND APPARATUS THEREFOR

TECHNICAL FIELD

The present invention relates to a convergent biometric authentication method based on finger joints and finger veins, and an apparatus therefor, and more particularly, to a biometric authentication method and an apparatus therefor which is capable of solving the problem of lowered recognition rates due to finger position changes by matching a finger joint fingerprint line image and a finger vein image, and capable of increasing recognition rates and authentication speed based on biometrics by using a fewer number of feature points than conventional biometric authentication methods.

RELATED ART

Recently, with rapid advances in industrial technologies and information process technologies, it is no exaggeration to say that we are living in an information society where there is a vast amount of collected information and there is a large amount of high quality information.

Accordingly, identifying users and authenticating their identities are becoming more and more important as a means to protect their personal information and property rights.

Conventionally, identification cards or user IDs and passwords are used to identity and authenticate users. However, in this way, users feel inconvenient because they need to carry their identification cards all the time or remember their IDs and passwords to identify themselves. Further, if their identification cards are lost or stolen, it is highly likely that the users are exposed to identity theft.

Recently, biometric authentication technologies using users' unique physiological and behavioral features have been hailed as a means to solve the above-described problems.

In general, biometric authentication technologies mean security technologies in which users are identified and authenticated through automated biometric authentication apparatuses on the basis of their unique biometric information. That is, in biometric authentication technologies, a user's unique biometric information (e.g. finger veins, fingerprints, irises, face shapes, voices or hand shapes etc.) is extracted and stored in a database provided to a biometric authentication apparatus, and afterwards, the biometric authentication apparatus measures biometric information of the user, compares the user's biometric information with pre-stored biometric information to identify and authenticate the user.

Further, biometric authentication technologies have the advantage of authenticating users in a safer and more convenient way than conventional identification cards, IDs and passwords because users do not need to carry their identification cards all the time or remember their IDs and passwords to identify themselves and exist at the time of authenticating themselves.

In particular, finger vein authentication technologies are capable of authenticating users' identity by using their finger vein patterns which are barely visible to the naked eyes as features inside the human body.

Further, biometric authentication apparatuses using finger vein authentication technologies radiate near infrared rays onto a user's finger on the basis of the feature that reduced hemoglobin in finger veins absorbs near infrared rays, and extract black-looking patterns (shapes) of the finger to identify the user and authenticate the user's identity.

That is, a biometric authentication apparatus using finger vein authentication technologies radiates neat infrared rays onto a user's finger, a small-sized CCD camera captures a digital image of the user's finger, the biometric authentication apparatus extracts finger vein patterns from the image, and compares the extracted finger vein patterns with finger vein patterns stored in a database to identify the user and authenticate the user's identity.

However, biometric authentication apparatuses using conventional finger vein authentication technologies have a low authentication speed because such biometric authentication apparatuses recognize a wide area of finger veins, are more sensitive to image noise that can be made by an image acquisition apparatus, and complicates image processing for separating finger veins from the background relative to fingerprint authentication apparatuses.

Further, conventional finger vein authentication apparatuses do not have a reference point that serves as a standard for comparing a user's finger vein patterns with pre-stored finger vein patterns. Accordingly, recognition rates are lowered due to finger position changes at the time of acquiring an image of the finger vein patterns.

According to the present invention, provided is a convergent biometric authentication method and apparatus therefor capable of minimizing a region of a finger vein image necessary for authentication by simultaneously using information on features of a user's finger joint fingerprint lines and finger veins, and capable of significantly increasing user authentication speed by means of vector-based feature points.

Further, according to the present invention, provided is a convergent biometric authentication method and apparatus therefor capable of carrying out a two-step authentication process by simultaneously using information on feature points of a user's finger joint fingerprint lines and finger veins to significantly increase recognition rates and reduce false recognition rates thereby providing convenience to the user.

Next, related arts to which the present invention pertains will be described briefly and afterwards, technical subjects of the present invention, which are different from those of the related arts, will be described.

First, Korean Patent No. 1496852 (Mar. 2, 2015) relates to a finger vein authentication system which extracts finger vein patterns contained in a finger image collected from a CDC camera, recognizes, compares and confirms the extracted finger vein patterns to authenticate a user by using a method for analyzing level set curvatures.

The above-described related art and the present invention are similar in that finger vein patterns are extracted from a user's finger image, and the extracted finger vein patterns are recognized for user identification and authentication. However, the above-described related art can cause lowered recognition rates due to finger position changes (e.g. a rotated position, an inclined position, a descended position or a lifted position etc.) at the time of acquiring a finger vein image because the above-described related art simply compares the extracted finger vein patterns and pre-sored finger vein patterns to authenticate the user.

On the contrary, the present invention skeletonizes finger veins and joint fingerprint lines extracted from an image acquired through a CCD camera, sets core points serving as a reference point by matching the skeletonized finger veins and joint fingerprint lines, and authenticates a user on the basis of the set core points such that the user may be identified and authenticated in an exact way regardless of finger position changes at the time of acquiring a finger vein image.

Further, Korean Patent No. 1037378 (May 27, 2011) relates to a biometric authentication system which acquires a body region (finger vein region), which is larger than that acquired at the time of authenticating a user, at the time of registering a user, combines the acquired finger veins and pre-stored finger veins even when a body part (finger) is dislocated on the authentication system, senses finger position changes to provide alarm services thereby helping a user to set the user's finger in the right position and then, perform a re-authentication process to authenticate the user.

The above-described related art and the present invention are similar in that finger position changes are sensed to authenticate a user. However, the above-described related art needs high capacity memory because of the large size image of finger vein patterns, which is acquired at the time of registering the user and spends much time on authentication due to the re-authentication process.

Further, Korean Laid-Open Patent Publication No. 2015-0104544 (Sep. 15, 2015) relates to a biometric authentication technology and to an authentication apparatus which captures images of finger joint fingerprints and finger veins respectively and combines the images to authenticate a user.

The above-described related art simply captures finger joint fingerprints and finger veins respectively to authenticate a user and does not suggest establishment of any relationship between the finger joint fingerprints and finger veins as a means to increase recognitions rates.

Further, Japanese Laid-Open Patent Publication No. 2014-167799 (Sep. 11, 2014) is characterized by acquiring a finger vein pattern image, performing a rotation amendment by using the outlines of the finger and authenticating a user in a precise way even when the finger in the finger vein pattern image is dislocated and unclear.

The above-described related art makes amendments by using finger outlines and is different from the present invention which derives relationships between finger veins and finger joint fingerprints and matches the finger veins and finger joint fingerprints to perform biometric authentication based on combination of the finger veins and finger joint fingerprints.

On the contrary, the present invention simultaneously acquires finger joint fingerprint lines and finger veins at the time of acquiring a finger vein image and matches the finger joint fingerprint lines and finger veins to minimize a region of the image necessary for authentication and uses vector-based feature points to significantly increase user authentication speed.

DETAILED DESCRIPTION OF THE INVENTION

Technical Problems

As a means to solve the above-described problems, the present invention is directed to providing a convergent biometric authentication method and an apparatus therefor which is capable of increasing recognition rates and authentication speed by matching finger joint fingerprint lines and finger veins by using a few number of feature points.

Further, the present invention is directed to providing a convergent biometric authentication method and an apparatus therefor which simultaneously acquires a finger joint fingerprint line image and finger vein image at the time of acquiring a finger vein image and matches the finger joint fingerprint line image and finger vein image to minimize the size of an image necessary for authentication, thereby making it possible to minimize the size of the convergent biometric authentication apparatus.

Further, the present invention is directed to providing a convergent biometric authentication method and an apparatus therefor in which a finger vein reader window is minimized to relieve users' unpleasant feelings thereby providing convenience at the time of capturing a finger vein image.

Further, the present invention is easily installed in various apparatuses requiring user authentication including means to control access to buildings, transportation vehicles, industrial apparatuses or automated teller machines (ATM) to immediately authenticate users thereby exerting control over them.

Technical Solutions

A convergent biometric authentication method based on finger joints and finger veins according to an embodiment of the present invention includes a step of acquiring a finger vein image to extract a finger vein skeleton line image, a step of acquiring a finger joint fingerprint line image to extract a finger joint fingerprint skeleton line image and a step of matching the finger vein skeleton line image to the finger joint fingerprint skeleton line image.

Further, the finger vein image is obtained by acquiring an image including the background and a finger from an image capture unit, extracting a finger region from the acquired image, segmenting the extracted finger region and extracting finger veins.

Further, the step of extracting a finger vein skeleton line image includes skeletonizing the segmented finger vein image to extract a finger vein skeleton line image.

Further, the finger joint fingerprint line image is obtained by acquiring an image including the background and a finger from the image capture unit, extracting a finger joint region from the acquired image and extracting finger joint fingerprint lines from the extracted finger joint region.

Further, the step of acquiring a finger joint fingerprint skeleton line image includes skeletonizing the extracted finger joint fingerprint lines to extract a finger joint fingerprint skeleton line image.

Further, the matching step includes rotating or moving a finger region image and a finger joint fingerprint region image to match the finger vein skeleton line image to the finger joint fingerprint skeleton line image.

Further, the convergent biometric authentication method further includes detecting one or more intersection points from the matching to set core points, and detecting and vectorizing feature points of the finger vein skeleton lines on the basis of the set core points.

Further, the convergent biometric authentication method includes detecting and vectorizing feature points of the finger joint fingerprint skeleton lines from the finger joint fingerprint skeleton line image, and authenticating a user on the basis of the vectorized feature points of the finger vein skeleton lines and the vectorized feature points of the finger joint fingerprint skeleton lines.

Additionally, a convergent biometric authentication apparatus based on finger joints and finger veins according to an embodiment of the present invention includes a finger vein image process unit for acquiring a finger vein image to extract a finger vein skeleton line image, a fingerprint line image process unit for acquiring a finger joint fingerprint line image to extract a finger joint fingerprint skeleton line image and a skeleton line image-matching unit for matching the finger vein skeleton line image to the finger joint fingerprint skeleton line image.

Further, the finger vein image process unit acquires an image including the background and a finger from an image capture unit, extracts a finger region from the acquired image, segments the extracted finger region to extract finger veins and to acquire a finger vein image, and skeletonizes the segmented finger vein image to extract a finger vein skeleton line image.

Further, the fingerprint line image process unit acquires an image including the background and a finger from the image capture unit, extracts a finger joint region from the acquired image, extracts finger joint fingerprint lines from the extracted finger joint region, and skeletonizes the extracted finger joint fingerprint lines to extract a finger joint fingerprint skeleton line image.

Further, the skeleton line image-matching unit rotates or moves a finger region image and a finger joint region image to match the finger vein skeleton line image to the finger joint fingerprint skeleton line image.

Further, the convergent biometric authentication apparatus includes a core point-setting unit for detecting one or more intersection points from the matching and for setting core points, and a finger vein feature point detection unit for detecting and vectorizing feature points of the finger vein skeleton lines on the basis of the set core points.

Further, the convergent biometric authentication apparatus includes a fingerprint feature point detection unit for detecting feature points of the finger joint fingerprint skeleton lines from the finger joint fingerprint skeleton line image and for vectorizing the feature points, and an authentication unit for authenticating a user on the basis of the vectorized feature points of the finger vein skeleton lines and the vectorized feature points of the finger joint fingerprint skeleton lines.

Advantageous Effects

The present invention relates to a convergent biometric authentication method based on finger joints and finger veins, and an apparatus therefor which can solve the problem of lowered recognition rates due to finger position changes by matching a user's finger joint fingerprint skeleton line image to the user's finger vein skeleton line image when the user's finger veins are registered or used to authenticate the user's identity.

Further, the present invention is effective in increasing recognition rates and authentication speed by means of a few number of feature points by matching a user's finger joint fingerprint skeleton line image to the user's finger vein skeleton line image.

Further, according to the present invention, a detected finger vein region of a finger and the size of the convergent biometric authentication apparatus may be minimized, making it possible to improve users' convenience and to relieve users' unpleasant feelings at the time of capturing their finger veins.

Further, the present invention carries out a two-step authentication process on the basis of feature points of a user's finger joint fingerprints and feature points of the user's finger veins, thereby significantly lowering false recognition rates.

BRIEF DESCRIPTION OF THE INVENTION

FIG. 1 is an illustration showing finger position changes that can lead to lowered recognition rates at the time of identifying finger veins according to an embodiment of the present invention.

FIG. 2 is a block diagram showing a configuration of a convergent biometric authentication apparatus based on finger joints and finger veins according to an embodiment of the present invention.

BEST MODE FOR CARRYING OUT THE INVENTION

Figure 3:
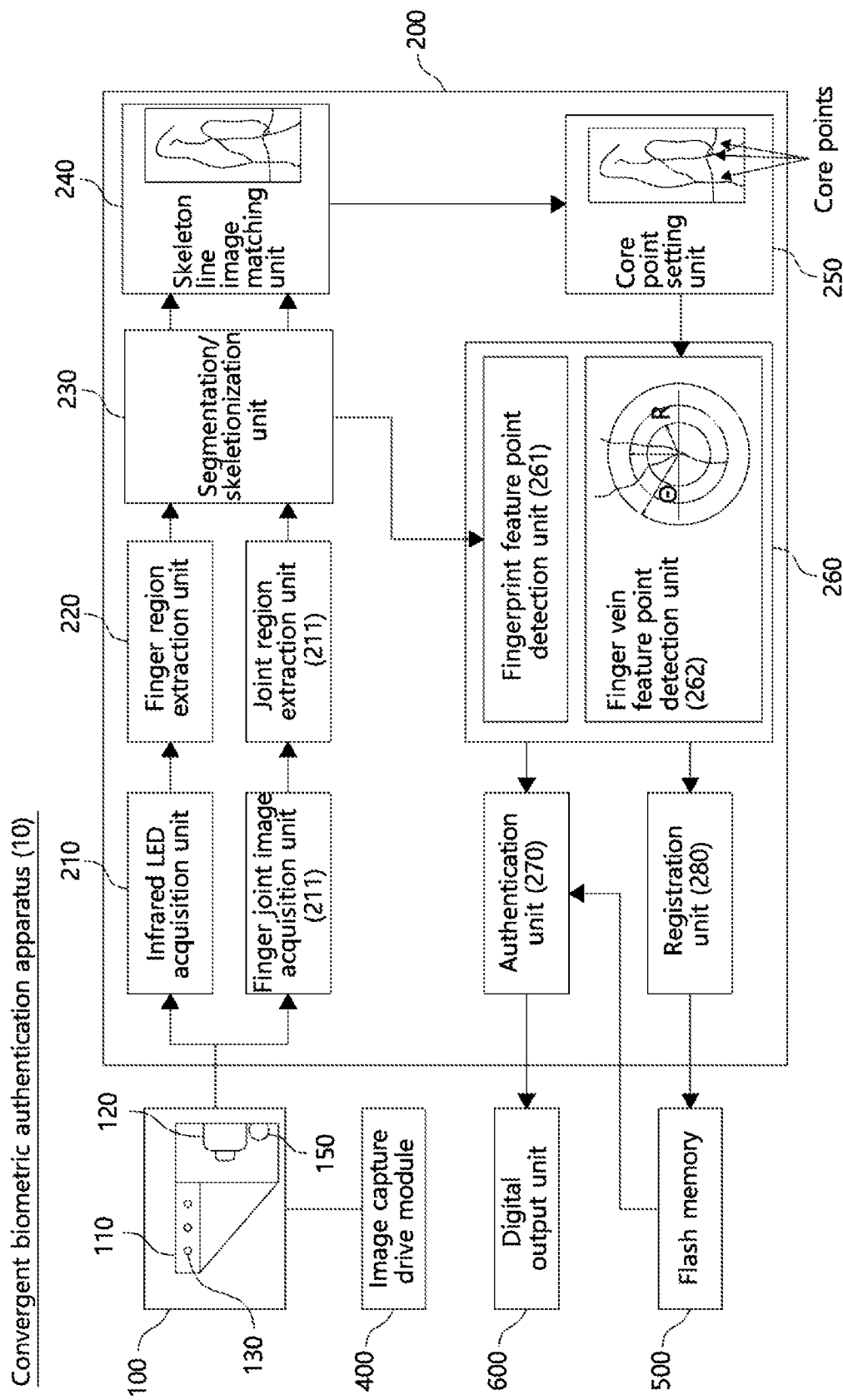
FIG. 3 is a block diagram showing a configuration of a user authentication unit when it comes to a convergent biometric authentication apparatus based on finger joints and finger veins according to an embodiment of the present invention.

Below, the preferred embodiments of the present invention will be described in detail with reference to the attached drawings. Like reference numerals denote like elements throughout the attached drawings.

FIG. 1 is an illustration showing finger position changes that can lead to lowered recognition rates at the time of identifying finger veins according to an embodiment of the present invention.

First, a conventional finger vein authentication apparatus captures a user's finger radiated by near infrared rays with a couple-charged device (CCD) camera to acquire a finger image, extracts finger vein patterns from the acquired finger image to store the finger vein patterns in a database, and compares the user's finger vein patterns with pre-stored finger vein patterns to identify the user.

The above-described conventional finger vein authentication apparatus is more sensitive to image noise that can be made by an image acquisition apparatus and complicates image processing for separating finger veins from the background relative to a user authentication apparatus using fingerprint authentication.

Further, the above-described conventional finger vein authentication apparatus does not have a reference point that serves as a standard for measuring similarity between a user's measured finger vein patterns and pre-store finger vein patterns. Accordingly, recognition rates are lowered due to finger position changes at the time of acquiring a finger vein image of the finger.

As shown in FIG. 1, finger position changes mean changes in the position at which a user's finger is set on the finger vein authentication apparatus, and include a normal position, a rotated position, an inclined position, a descended position or a lifted position etc.

Further, as shown in FIG. 1, a finger vein image may be captured in the state in which the finger vein image is tilted to one side due to finger position changes. Accordingly, a change in the position of the finger vein patterns can be made. As a result, recognition rates are lowered at the time of authenticating a user by means of finger veins.

Further, the above-described conventional finger vein authentication apparatus simply recognizes finger vein shapes (patterns) to identify and authenticate a user. Accordingly, much time is spent on authentication processing. Additionally, finger veins expand or contract because of exercise, hot weather, cold weather, or other environmental factors. In this case, false recognition of finger vein patterns can occur.

According to the present invention, provided is a convergent biometric authentication method and apparatus therefor which is capable of recognizing finger position changes thereby exactly authenticating a user and solving the problem of lowered recognition rates by matching a finger joint fingerprint line image to a finger vein skeleton line image.

Further, according to the present invention, provided is a convergent biometric authentication method and apparatus therefor which is capable of increasing recognition rates and authentication speed regardless of the environmental factors by detecting vector-based user features points on the basis of the image matching to authenticate the user by means of a few number of feature points, not by simply using finger vein patterns to authenticate the user.

FIG. 2 is a block diagram showing a configuration of a convergent biometric authentication apparatus based on finger joints and finger veins according to an embodiment of the present invention.

As illustrated in FIG. 2, the convergent biometric authentication apparatus based on finger joints and finger veins 10 includes an image capture unit 100 for capturing an infrared LED finger vein image and a finger joint image of a user's finger, a user authentication unit 200 for detecting user feature points of the user on the basis of the captured infrared LED finger vein image and the finger joint image to register and authenticate the user, a control unit 300 for controlling each element of the biometric authentication apparatus, an image capture unit drive module 400 for controlling the image capture unit 100 according to control by the control unit 300, flash memory 500 for storing the detected user feature points, a digital output unit 600 for outputting results of operations carried out by the user authentication unit 200 through a liquid crystal display (LCD) or a speaker, an Ethernet communication module 700 for carrying out communication between the convergent biometric authentication apparatus 10 and external apparatuses linked with the convergent biometric authentication apparatus 10 to control the user, and a power supply unit 800 for supplying power to the convergent biometric authentication apparatus 10.

Further, the image capture unit 100 senses a user's finger set on the convergent biometric authentication apparatus 10 and simultaneously captures an infrared LED finger vein image and a finger joint image of the user's finger to provide the infrared LED finger vein image and the finger joint image to the user authentication unit 200.

Further, the image capture unit 100 radiates near infrared rays onto the user's finger to capture the infrared LED finger vein image, and radiates white light onto the user's finger to capture the finger joint image.

Further, the user authentication unit 200 processes the captured infrared LED finger vein image and the captured finger joint image, detects user feature points, identify the user and authenticates the user on the basis of the user feature points.

Further, the user feature points include feature points of the user's finger veins and finger joint fingerprint lines. The feature points of the finger veins include directions or sizes of the finger veins, a branch point, a direction, or the number etc. of the finger veins, and the feature points of the finger joint fingerprint lines include the number of the finger joint fingerprint lines, distances between the finger joint fingerprint lines or a combination thereof.

Meanwhile, the user authentication unit 200 as an essential element of the present invention will be described in detail with reference to FIG. 3.

Further, the control unit 300 executes entire control over dataflow between elements consisting of the convergent biometric authentication apparatus 10, or drive between each of the elements etc.

Further, the image capture unit drive module 400 is controlled by the control unit 300 and controls the image capture unit 100 to acquire the user's finger image.

Meanwhile, the convergent biometric authentication apparatus 10 issues not only the detected user feature points but also an ID and password to the user to authenticate the user and may combine the user feature points, the ID and the password to double-or triple-identify the user and double-or triple-authenticate the user.

Further, the convergent biometric authentication apparatus 10 creates and stores a mapping table in which detected user feature points of each user are matched to the ID or name of each user, and when authenticating a user, immediately searches for user feature points of the user by using the mapping table to authenticate the user.

Further, the flash memory 500 stores information on a user including the mapping table, the user's ID and password.

Further, the digital output unit 500 may output results as to whether a user is authenticated and the user is registered through an LCD or a speaker provided to the convergent biometric authentication apparatus 10 and may display procedures and other information necessary for authentication and registration on the LCD to provide convenience to the user.

Further, the LCD incorporates a touch sensor, and the user may easily operate the convergent biometric authentication apparatus 10 through a touch.

Further, the Ethernet communication module 700 may carry out communication between an external apparatus linked with the convergent biometric authentication apparatus 10 and the convergent biometric authentication apparatus 10 to control the external apparatus according to results of authentication.

FIG. 3 is a block diagram showing a configuration of a user authentication unit, when it comes to a convergent biometric authentication apparatus based on finger joints and finger veins according to an embodiment of the present invention.

As illustrated in FIG. 3, the user authentication unit 200 processes a finger image captured by the image capture unit 100 and detects user feature points to store the detected user feature points in the flash memory 500 or measures similarity between the detected user feature points and pre-store user feature points to identify a user and to authenticate the user.

Further, the image capture unit 100 includes a finger vein reader window 110 on which the finger is set, a couple-charged device (CCD) camera 120 for capturing an infrared LED finger vein image and a finger joint image of the set finger at the same time, a near infrared ray LED 130 for radiating near infrared rays onto the finger vein reader window 110, and a white light LED 150 for radiating white light into the finger vein reader window 110.

Further, the image capture unit 100 lights up the near infrared ray LED 130 to capture an infrared LED finger vein image and lights up the white light LED 150 to capture a finger joint image according to control by the image capture unit drive module 400.

Further, the finger vein reader window 110 incorporates a touch sensor for sensing a touch of a user, and the touch sensor senses a user's finger set on the finger vein reader window 110 to allow automatic capture of the finger.

Further, the user authentication unit 200 includes a finger vein image process unit for acquiring a finger vein image from the infrared LED finger vein image to extract a finger vein skeleton line image, a fingerprint line image process unit for acquiring a finger joint fingerprint line image from the finger joint image to extract a finger joint fingerprint skeleton line image, a skeleton line image-matching unit 240 for matching the extracted finger vein skeleton line image to the extracted finger joint fingerprint skeleton line image, a core point-setting unit 250 for setting core points on the basis of the matched skeleton line image, a feature point detection unit 260 for detecting user feature points, a registration unit 280 for storing the detected user feature points to register a user, and an authentication unit 270 for comparing the detected user feature points with pre-stored feature points to authenticate the user or to deny authentication to the user.

Further, the finger vein image process unit includes an infrared LED finger vein image acquisition unit 210 for acquiring an infrared LED finger vein image from the image capture unit 100 to acquire a finger vein image by processing the infrared LED finger vein image acquired from the image capture unit 100, a finger region extraction unit 220 for extracting a finger region from the acquired infrared LED finger vein image, and a segmentation/skeletonization unit 230 for acquiring a finger vein image from the extracted finger region and for extracting a finger vein skeleton line image from the acquired finger vein image.

Further, the infrared LED finger vein image acquisition unit 210 acquires an infrared LED finger vein image captured by means of near infrared rays radiated onto the finger vein reader window 110.

Meanwhile, the acquired infrared LED finger vein image is configured to be an image including a finger region containing the user's finger veins and the background.

Further, the finger region extraction unit 220 extracts a finger region from the acquired infrared LED finger vein image, and the finger region is extracted through extraction of the image edge of the infrared LED finger vein image.

Meanwhile, the image edge means a point at which brightness of the digital image changes from a low level to a high level or from a high level to a low level and means a boundary between individual objects the digital image includes. That is, in the acquired infrared LED finger vein image, the boundary between the finger region and the background is at the point at which brightness of the image changes from a low level to a high level or from a high level to a low level. Accordingly, the finger region may be extracted by means of this feature.

Further, the extraction of the image edge may be carried out through one or more methodologies including difference operators, thresholds, first derivatives or homogeneity operators.

Further, the segmentation/skeletonization unit 230 emphasizes finger veins existing within the extracted finger region by applying a Gaussian filter, and segments the extracted finger region on the basis of threshold value to acquire the finger veins.

Further, the segmentation is carried out to separate the finger veins from the finger region to extract the finger veins. Through this, a more exact and clear image of finger veins may be acquired.

Further, the segmentation/skeletonization unit 230 skeletonizes the acquired finger vein image to extract a finger vein skeleton line image.

Further, the fingerprint line image process unit includes a finger joint image acquisition unit 211 for acquiring a finger joint image from the image capture unit 100 to acquire a finger joint fingerprint line image by processing the finger joint image acquired from the image capture unit 100, a joint region extraction unit 221 for extracting a finger joint region from the acquired finger joint image, and a segmentation/skeletonization unit 230 for acquiring a finger joint fingerprint line image from the extracted finger joint region and for extracting a finger joint fingerprint skeleton line image from the acquired finger joint fingerprint line image.

Further, the finger joint image acquisition unit 211 acquires a finger joint image captured by means of white light radiated onto the finger vein reader window 110.

Meanwhile, the acquired finger joint image is configured to be an image including a finger region containing the user's finger joint fingerprint lines, and the background.

Further, the joint region extraction unit 221 extracts a finger joint region from the acquired finger joint image, and the finger joint region is extracted as threshold value on the basis of RGB values of the skin of the finger joint image.

Further, the segmentation/skeletonization unit 230 converts an image of the extracted finger joint region into a gray scale image, extracts joint fingerprint lines consisting of horizontal lines by using a Sobel horizontal edge mask, and obtains a finger joint fingerprint line image.

Meanwhile, the technology of extracting a specific edge from a specific digital image by applying a Sobel horizontal edge mask is well known. Accordingly, the technology will not be described in detail.

Further, the segmentation/skeletonization unit 230 skeletonizes the acquired finger joint fingerprint line image to extract a finger joint fingerprint skeleton line image.

Further, the skeleton line image-matching unit 240 rotates or moves the extracted finger region image and the finger joint region image to match the finger vein skeleton line image to the finger joint fingerprint skeleton line image.

Further, the core point-setting unit 250 detects one or more intersection points from the matched image and sets the detected intersection points as a reference point (core point) of the relevant image.

Further, the feature point detection unit 260 includes a fingerprint line feature point detection unit 261 and a finger vein feature point detection unit 262.

Further, the fingerprint line feature point detection unit 261 detects feature points of joint fingerprint lines (e.g. the number of joint fingerprint lines and distances between joint fingerprint lines) from the joint fingerprint skeleton line image extracted by the segmentation/skeletonization unit 230 and vectorizes the feature points.

Meanwhile, joint fingerprint lines are a type of fingerprints, which are formed at finger joints by means of the movement of finger joints and includes a plurality of fingerprint lines. Patterns of joint fingerprint lines vary from person to person and may be used to authenticate a user as a biometric feature.

Further, the finger vein feature point detection unit 262 detects feature points of joint veins from the matched image on the basis of the set core points and vectorizes the feature points.

Meanwhile, the finger vein feature point detection unit 262 detects binary pixel points of finger veins of the relevant image while rotating a R radius detection point with respect to the set core point to extract a distance and angle of the detected pixel point, and extracts branch points of the finger veins on the basis of the extracted distance and angle to detect feature points of the finger veins.

Further, the branch point of finger veins is extracted by means of a 3×3 kernel mask for detecting branch points.

Further, the biometric authentication apparatus 10 uses the detected feature points of joint fingerprint lines and the detected feature points of finger veins as data for authenticating a user.

Accordingly, the present invention simultaneously detects user feature points including the feature points of joint fingerprint lines and the feature points of finger veins detected by the feature point detection unit 26, and the detected user feature points are used for a two-step authentication process thereby helping recognize and authenticate a user's identity more exactly.

Meanwhile, conventional finger vein authentication apparatuses need a two-or-more-finger-joint-size finger vein image (50 mm for adults) to extract finger vein patterns necessary for authenticating a user. However, the present invention needs a one-finger-joint-size (less than or equal to 30 mm) to extract feature points necessary for authenticating a user by matching the finger joint fingerprint skeleton line image and the finger vein skeleton line image. This makes it possible to minimize the finger vein reader window 110 compared to conventional finger vein authentication apparatuses.

Further, at the time of registering a user, the registration unit 280 detects feature points of the user's joint fingerprint lines and finger veins three to five times, automatically gives identification codes to each of the detected feature points, and carries out mapping of the identification codes with the user's name or ID to store the mapping table in flash memory 500. Meanwhile, the registration unit 280 may cluster the feature points of the joint fingerprint lines and finger veins for each user to store the clustered feature points of the joint fingerprint lines and finger veins. As a result, at the time of authenticating a specific user, the registration unit searches only for the clustered feature points of the joint fingerprint lines and finger veins for each user to measure similarity without searching for all the pre-stored feature points of joint fingerprint lines and finger veins. This makes it possible to reduce time spent on authentication.

Further, each of the pre-store feature points is vectorized, and at the time of authenticating a user, only similarity of the vectors is measured. As a result, time spent on authentication is significantly reduced.

Further, to carry out authentication, the authentication unit 270 searches for all the feature points of registered users to measure similarity or searches only for the clustered user feature points for each user to measure similarity.

Further, when the measured similarity is more than or equal to a pre-set threshold value, the authentication unit confirms a registered user and authenticates the user and when the measured similarity is less than or equal to a pre-set threshold value, denies authentication to the user.

Figure 4:
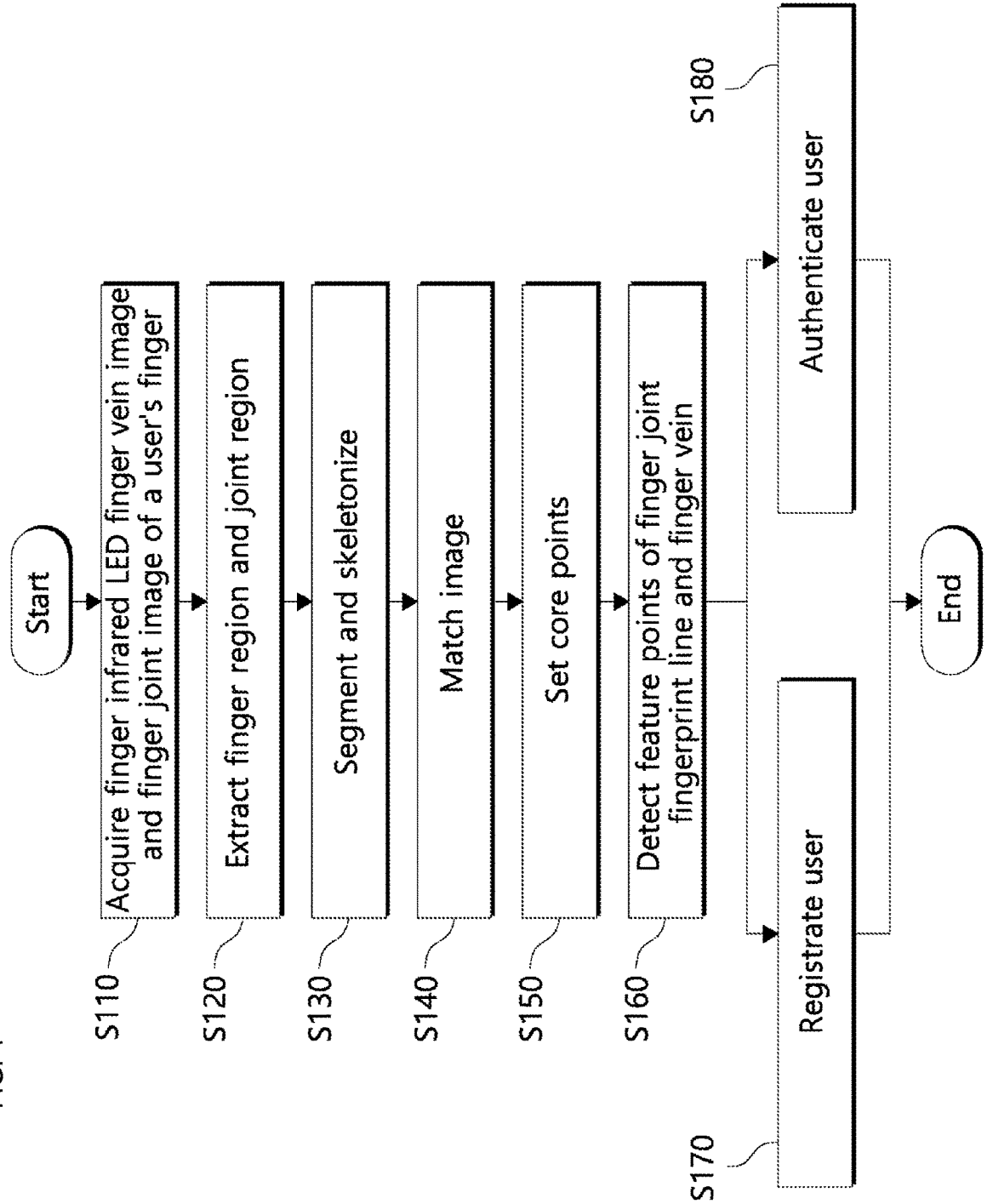
FIG. 4 is a flowchart showing procedures of registering a user or identifying a user on the basis of feature points of the user's finger joint fingerprint lines and feature points of the user's finger veins according to an embodiment of the present invention.

FIG. 4 is a flowchart showing a procedure of registering a user or authenticating the user on the basis of feature points of the user's joint fingerprint lines and finger veins according to an embodiment of the present invention.

As illustrated in FIG. 4, a procedure of registering a user or authenticating the user on the basis of feature points of the user's joint fingerprint lines and finger veins includes capturing an infrared LED finger vein image and a finger joint image of the user's finger by an image capture unit 100 to acquire the infrared LED finger vein image and the finger joint image (S 110).

Meanwhile, the infrared LED finger vein image is captured by means of near infrared rays radiated onto the user's finger set on a finger vein reader window 110, and the finger joint image is captured by means of white light radiated onto the user's finger.

Next, a finger region is extracted from the acquired infrared LED finger vein image, and a finger joint is extracted from the acquired finger joint image (S 120).

Meanwhile, the finger region means a part except the background in the infrared LED finger vein image containing a finger region and the background and may be extracted through extraction of the image edge of the infrared LED finger vein image.

Further, the extracted finger joint region may be extracted as threshold value on the basis of skin RGB values.

Next, a finger vein part within the extracted finger region is emphasized by means of a Gaussian filter and is segmented on the basis of threshold value. Further, the finger joint image is converted into a gray scale image, finger joint fingerprint lines are extracted, the segmented image and the extracted joint fingerprint lines are skeletonized, and a skeleton line image is extracted (S130).

Meanwhile, the segmented image is an image in which a finger vein part within the finger region is extracted, and the finger joint fingerprint lines are fingerprint lines of the first joint from the tip of a finger set on the convergent biometric authentication apparatus 10.

Further, the joint fingerprint lines include a plurality of lines, and feature points of the joint fingerprint lines (e.g. the number of fingerprint lines or a distance between fingerprint lines) are unique to each user.

Next, each of the extracted skeleton line images are matched (S 140).

Meanwhile, the convergent biometric authentication apparatus 10 rotates or moves the finger region image and the finger joint region image to match the finger vein skeleton line image to the finger joint fingerprint skeleton line image.

Next, one or more core points are set through the matched image (S 150).

Meanwhile, core points mean intersection points of the finger veins and the joint fingerprint lines in the matched image.

Next, user feature points including feature points of joint veins from the matched image and feature points of joint fingerprint lines from the joint fingerprint skeleton line image on the basis of the core points are detected and vectorized (S 160).

Meanwhile, the finger vein feature points include a distance and an angle between finger veins and pixel points in the matched image, branch points of the finger veins or a combination thereof.

Next, the vectorized feature points of the finger veins and joint fingerprint lines extracted three to five times are stored in flash memory 500, identification codes are automatically given to each of the vectorized data, and the given identification codes and the user's name or ID are matched and stored in the flash memory 500, and the user is registered (S 170).

Further, the procedure of authenticating the user includes matching the feature points of the finger veins and joint fingerprint lines detected from the user and all the pre-store feature points of the user's finger veins and joint fingerprint lines are matched to measure similarity and confirming that the user is a registered user when the measured similarity is more than or equal to a certain threshold value (S 180).

Meanwhile, the procedure of authenticating the user's identity includes denying authentication to the user when the measured similarity is less than or equal to a certain threshold value.

As described above, a convergent biometric authentication method and apparatus therefor based on finger joints and finger veins of the present invention is capable of minimizing a region necessary for authentication by matching a finger vein image and a finger joint fingerprint image and capable of solving the problem of false recognition caused by finger position changes thereby providing convenience to users.

Further, the present invention authenticates a user by using vector-based user feature points thereby increasing authentication speed and leading to a significant reduction in time spent on authentication and carries out a two-step authentication process by simultaneously using feature points of a user's finger joint fingerprints and finger veins thereby increasing recognition rates and reducing false recognition rates.

The invention has been described in relation to its preferred embodiments. However, the technical idea of the present invention should not be construed as being limited to the embodiments set forth herein. Each element of the present invention may be changed and modified within the technical scope the present invention so as to achieve the same purposes and effects.

Further, the invention has been illustrated and described in relation to its preferred embodiments. However, the present invention should not be construed as being limited to the embodiments set forth herein. It should be understood that various modifications and changes may be made by those skilled in the art to which the present invention pertains without departing from the gist of the invention claimed in the appended claims and that all the modifications should be construed as being included in the technical idea and prospect of the present invention.

INDUSTRIAL APPLICABILITY

The present invention can solve the problem of lowered recognition rates due to finger position changes, can increase recognition rates and authentication speed by using a few number of feature points, can minimize the size of a convergent biometric authentication apparatus making it possible to improve users' convenience and to relieve user's unpleasant feelings at the time of capturing a finger vein image, and can carry out a two-step authentication process on the basis of feature points of a user's finger joint fingerprints and finger veins thereby significantly lowering false recognition rates.

The invention claimed is:

1. A convergent biometric authentication method, comprising:
   acquiring a finger vein image to extract a finger vein skeleton line image;
   acquiring a finger joint fingerprint line image to extract a finger joint fingerprint skeleton line image; and
   matching the finger vein skeleton line image to the finger joint fingerprint skeleton line image, wherein the matching comprises rotating or moving a finger region image and a finger joint fingerprint region image to match the finger vein skeleton line image to the finger joint fingerprint skeleton line image.

2. The convergent biometric authentication method according to claim 1, wherein the finger vein image is obtained from an image including the background and a finger from an image capture unit, extracting a finger region from the acquired image, segmenting the extracted finger region and extracting finger veins.

3. The convergent biometric authentication method according to claim 2, wherein the extracting a finger vein skeleton line image comprises skeletonizing the segmented finger vein image to extract a finger vein skeleton line image.

4. The convergent biometric authentication method according to claim 1, wherein the finger joint fingerprint line image is obtained from an image including the background and a finger from an image capture unit extracting a finger joint region from the acquired image and extracting finger joint fingerprint lines from the extracted finger joint region.

5. The convergent biometric authentication method according to claim 4, wherein the step of acquiring the finger joint fingerprint skeleton line image comprises skeletonizing the extracted finger joint fingerprint lines to extract a finger joint fingerprint skeleton line image.

6. The convergent biometric authentication method according to claim 1, the convergent biometric authentication method further comprising:
   detecting one or more intersection points from the matching to set core points; and
   detecting and vectorizing feature points of finger vein skeleton lines on the basis of the set core points.

7. The convergent biometric authentication method according to claim 6, the convergent biometric authentication method comprising:
   detecting and vectorizing feature points of finger joint fingerprint skeleton lines from the finger joint fingerprint skeleton line image; and
   authenticating a user on the basis of the vectorized feature points of the finger vein skeleton lines and the vectorized feature points of the finger joint fingerprint skeleton lines.

* * * * *